April 11, 1961 R. G. SCHAYES 2,979,665
PUSH-PULL AMPLIFIER
Filed June 11, 1956
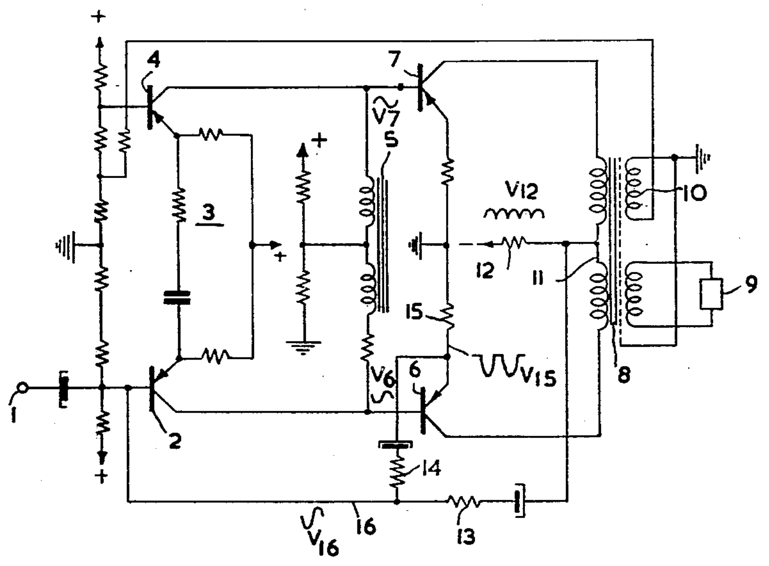
INVENTOR
RAYMOND GEORGES SCHAYES
BY Fred M. Vogel
AGENT 2,979,665

PUSH-PULL AMPLIFIER

Raymond Georges Schayes, Brussels, Belgium, assignor, by mesne assignments, to North American Philips Company, Inc., New York, N.Y., a corporation of Delaware Filed June 11, 1956, Ser. No. 590,772

Claims priority, application Netherlands June 10, 1955

3 Claims. (Cl. 330—14)

This invention relates to push-pull amplifiers comprising two alternately conducting push-pull connected amplification stages and inverse feedback. It has more particularly for its object to employ current inverse feedback in such amplifiers, that is to say to produce an inverse feedback signal proportional to the output current which, for example combined with voltage inverse feedback, yields a stable amplifier involving little distortion and having the prescribed output impedance.

However, the production of this current inverse feedback signal entails difficulties, since said amplification stages are periodically non-conductive. The invention has for its object to obviate these difficulties and has the feature that the co-phasal circuit of the amplification stages comprises an impedance across which a voltage is produced which is combined with the voltage across an impedance in the output circuit of only one of the amplification stages in order to produce an inverse feedback signal which is proportional to the output current.

In order that the invention may be readily carried into effect, an example will now be described with reference to the accompanying drawing.

The signals to be amplified are supplied to an input terminal 1 of an amplifier 2 in class A-setting, more especially but not exclusively a transistor-amplifier which drives in opposite phase, through emitter-coupling over a network 3, a similar amplifier 4, thereby producing a push-pull signal $V_6$, $V_7$ across a collector-output impedance 5.

The signal is amplified in two push-pull connected alternately conducting amplification stages 6 and 7, for example in class B- or to slight degree in class AB-setting and is subsequently supplied through a push-pull output transformer 8 to a load-impedance 9. The transformer 8 comprises a tertiary winding 10 across which is set up an inverse feedback signal which is proportional to the output voltage and supplied in parallel with the input circuit of the amplifier 4. If desired, this inverse feedback voltage may alternatively be introduced in series into the base circuit of the transistor 4 in order to economize blocking resistors. However, the production of an inverse feedback signal proportional to the output current involves more difficulties, because such a signal is produced in none of the circuits so far described due to the periodically non-conducting amplifiers 6 and 7.

In accordance with the invention, the co-phasal circuit of the amplification stages 6 and 7, which connects the midpoint 11 of the primary winding of the transformer 8 to the supply, comprises an impedance 12 across which a voltage $V_{12}$ is consequently produced as a function of time, which voltage is made up of the halves of the voltages $V_6$ and $V_7$ respectively alternately transmitted by the amplifiers 6 and 7 respectively. By means of blocking resistors 13 and 14 respectively said voltage $V_{12}$ is combined with the voltage $V_{15}$ produced across the resistor 15 in the output circuit of the amplifier 6 alone, thereby producing at 16 a current inverse feedback signal $V_{16}$ which is fed back to the amplifier 2 and exactly corresponds to the current produced in the output circuit of the stages 6, 7.

The resistors 13 and 14 may, for example, be equal (say 2K ohms), in which case the value of the resistor 15 should be twice that of the resistor 12 (say 20 and 10 ohms respectively) in order for the voltage $V_{15}$ to be twice as high as the voltage $V_{12}$ and for the inverse feedback signal $V_{16}$ to have the same proportionality factor relative to the output current in both phases. If the values of the resistors 13 and 14 are unequal, the resistors 12 and 15 should be matched accordingly.

The invention has only been described with reference to transistor-amplifiers. However, it may alternatively be employed in tube-amplifiers in exactly the same manner.

What is claimed is:

1. A push pull amplifier of the type having a pair of alternately conducting amplifier stages connected in push pull with a common output circuit and having an input circuit connected to supply a push-pull signal to said amplifier stages, said amplifier comprising first impedance means connected in common to signal paths of both of said stages to provide a cophasal voltage, second impedance means connected in the signal path of only one of said stages to provide a half wave signal voltage in accordance with the signal current in said one stage, means connected to combine only said cophasal and half wave voltages with opposite polarities, said combining means including means to determine the relative amplitudes of the signals combined in said combining means thereby to provide a full wave signal voltage in accordance with the current in said common output circuit, and means connected to feed back said full wave signal voltage to said input circuit in a degenerative relationship with respect to said push-pull signal.

2. A push-pull amplifier comprising two alternately conducting amplifier stages connected in push pull and having an input circuit connected to supply a push pull signal to said amplifier stages, a first impedance member connected in common in the signal current paths of both said stages thereby to develop a cophasal signal voltage, a second impedance member connected in the signal current path of only one of said stages thereby to develop a half wave signal voltage in accordance with the signal current in said one stage, combining circuit means connected to combine only said cophasal and half wave voltages with opposite polarities, and means connected to feedback the combined said signal voltages to said input circuit in a degenerative relationship with respect to said push pull signal, said combining means and impedance means being proportional so that the combined said signal voltages fed back to said input circuit have the same proportionality factor relative to the output current of both of said stages.

3. A push pull amplifier comprising two amplifier stages connected in push-pull and having a common output circuit, an input circuit for converting an input signal into a push-pull signal, means for applying said push pull signal to said amplifier stages so that said amplifier stages are alternately conductive, a first impedance member connected in common in the signal current paths of both of said stages thereby to develop a cophasal signal voltage, a second impedance member connected in the signal current path of only one of said stages thereby to develop a half wave signal voltage in accordance with the signal current in said one stage, combining circuit means connected to combine only said cophasal and half wave voltages with opposite polarities thereby to produce a full wave signal voltage corresponding to current in said common output circuit, said combining means including first and second impedance means for determining the relative amplitudes of said cophasal and half wave voltages respectively combined in said combining means, and means connected to feedback said full wave signal voltage to said input circuit in a degenerative relationship with respect to said push pull signal.

References Cited in the file of this patent

UNITED STATES PATENTS

| | | |
|---|---|---|
| 1,955,827 | Peterson | Apr. 24, 1934 |
| 2,531,458 | Nye | Nov. 28, 1950 |
| 2,542,160 | Stoner et al. | Feb. 20, 1951 |
| 2,714,137 | Dzwons | July 26, 1955 |
| 2,813,934 | Cibelius et al. | Nov. 19, 1957 |

FOREIGN PATENTS

| | | |
|---|---|---|
| 74,302 | Denmark | June 16, 1952 |

OTHER REFERENCES

Kiebert, Jr.: "Circuit Design Factors for Audio Amplifiers," Electronics, April 1955, pages 166–171.